July 12, 1932. A. G. SUELFLOW ET AL 1,867,533
VEGETABLE ROOT WASHER
Filed Oct. 17, 1930

Inventors
A. G. Suelflow
C. Wolford

Patented July 12, 1932

1,867,533

UNITED STATES PATENT OFFICE

ALFRED G. SUELFLOW AND CHARLES WOLFORD, OF MILWAUKEE, WISCONSIN, ASSIGNORS TO FELINS TYING MACHINE COMPANY, OF MILWAUKEE, WISCONSIN

VEGETABLE ROOT WASHER

Application filed October 17, 1930. Serial No. 489,384.

This invention relates to improvements in vegetable root washers.

One of the objects of the present invention is the provision of an improved type of washer which is especially adapted for use for washing vegetable roots, such as radishes, turnips, onions, and similar root vegetables, which are used for marketing purposes, so that these vegetables can be sent to the market in a comparatively clean and neat condition which will add to the market value of the same and present a neat appearance at the retailers.

Another object of the present invention is the provision of a vegetable root washer which includes the mounting of the washing drum eccentrically with a water supply pipe extending through the drum and provided with a plurality of perforations for spraying the vegetable roots as they are agitated around the drum to thoroughly remove dirt and other substances from the vegetable roots so as to thoroughly clean them for marketing purposes.

A further object of the present invention is the provision of a vegetable root washer which includes an eccentrically mounted rotary drum, provided with a plurality of longitudinal grooves to assist in the agitation of the vegetable roots during the rotation of the drum, and has a perforated discharge pipe extending through the drum for discharging a cleaning fluid onto the vegetables in the drum, and the device further includes a movable door member adjacent one end of the drum whereby the vegetables can be easily placed therein, or quickly removed.

With the above and other objects in view, the invention consists in the novel features of construction, the combination and arrangement of parts hereinafter more fully set forth, pointed out in the claim and shown in the accompanying drawing wherein:

Figure 1:
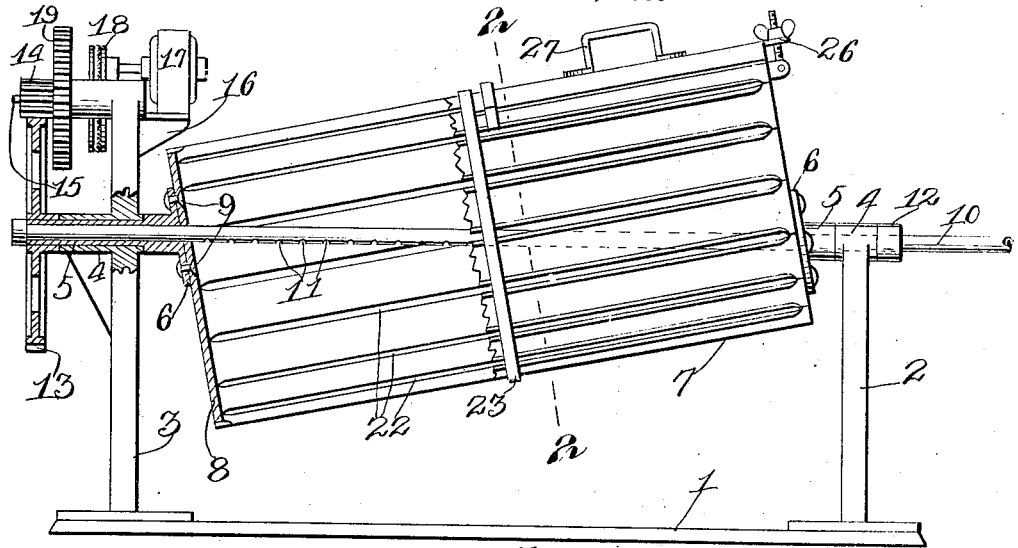
Figure 1 is a side elevation of a vegetable root washer constructed in accordance with our invention with parts thereof broken away and illustrated in cross section.

In carrying out this invention a base member 1 is provided and mounted on this base member are the spaced standards 2 and 3. The upper end of each standard is provided with a bearing sleeve 4 and rotatably mounted in bearing sleeves 4 are the trunnions 5, the inner ends of which are provided with head plates 6, adapted to be connected to the ends of the drum 7.

In order to eccentrically mount drum 7, the head plates 6 are secured to opposite ends of the drum at diametric points, as illustrated in Figure 1, thus one of the head members will be secured to one end of the drum upon one side of the longitudinal center of the drum, while the other head 6 will be secured to the other end of the drum upon the opposite side of the longitudinal center of the drum from the first head. These heads are securely connected to the end members 8 of the drum by means of the rivets 9.

Extending through the trunnion sleeves 5 is a feed pipe 10, which passes longitudinally through the drum 7 and is provided in that portion of its length within the drum, with a plurality of perforations 11 for discharging cleaning fluid into the drum onto the articles therein.

Mounted upon the pipe 10 and connected thereto is a stop collar 12 which is adapted to engage the sleeve 4 on the standard 2, to retain the trunnion sleeve 5 against longitudinal movement in one direction. Keyed to the outer end of the trunnion sleeve 5, mounted in standard 3, is a gear 13 meshing with a pinion 14 on shaft 15.

A bracket 16 is supported by standard 3 and mounted on this bracket is a motor 17 operatively connected with a pulley 18 which in turn is operatively connected to gear 19 on shaft 15 whereby a comparatively slow rotative movement is imparted to the drum 7.

Figure 2:
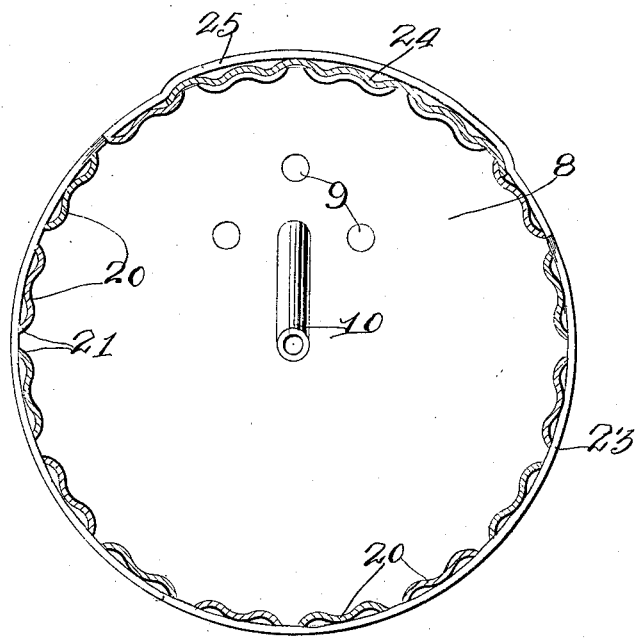
Figure 2 is a transverse sectional view on the line 2—2 of Figure 1.

In the construction of the drum 7, the ends 8 are comparatively solid with the exception of eccentric openings through which the pipe 10 passes. Extending longitudinally between the two heads are the slats 20 which are preferably corrugated in form as shown in Figure 2, the ends of the corrugated slats being welded or otherwise connected to the exterior of the ends 8, and the longitudinal edges of each slat are curved outwardly, as shown at 21 and arranged in longitudinal spaced relation to provide slots 22, whereby the water being discharged into the drum through the perforations 8 may pass out and not be contained within the drum.

The slats 20 which form the body of the drum are reinforced at the central portion thereof by means of a band 23 which may be welded or otherwise connected to the slats 20 intermediate their ends.

The slats are cut away at one portion of the drum to form an inlet opening and this opening is normally closed by means of a sliding corrugated plate 24, the corrugations in the plate conforming to the corrugations in the slats, so that the door plate 24 can be quickly and easily moved to an open or closed position, and when in a closed position, the inner end thereof projects beneath an arcuate guide 25, while the outer end is engaged by a retaining member 26. The door plate is provided with a handle 27, whereby the same may be readily manipulated when it is desired to open and close the opening in the drum.

In using our improved device, the cover plate 24 is moved to an open position and the vegetables deposited in the cylinder or drum 7 and as the water is turned into the discharge pipe 10, the motor 17 is started to rotate the drum, as the drum rotates the vegetables being cleaned will be carried toward the bottom of the drum and due to the eccentric mounting of the drum, will also be carried from one end of the drum to the other, thus thoroughly depositing the vegetables in the drum during the rotation thereof, and as the water or cleansing fluid is being discharged on the vegetables under pressure, the vegetables will be readily cleaned during the rotation of the drum with the waste cleansing fluid passing through the slots 22.

This type of washer is particularly adapted for washing various types of vegetable roots, such as radishes, turnips, onions, and the like, and these vegetables after being placed within the drum are not only rotated with the drum, but are tumbled about and due to the discharge of the cleansing fluid under pressure as the vegetables are tumbled about in the drum, they will be thoroughly cleaned in a very short time. Due to the eccentric mounting of the drum, the vegetables will have a tendency to be shifted longitudinally of the drum, as well as tumbled about therein.

The device is extremely simple in construction and can be manufactured and placed on the market at a very low cost and the effectiveness and usefulness of the device will be readily apparent from the foregoing description.

While we have shown and described the preferred embodiment of our invention, it will be apparent from the foregoing that slight changes may be made in the construction when putting the invention into practice without departing from the spirit of the same or the scope of the appended claim.

We claim:

A device for washing vegetables comprising a cylinder including rigid end heads and corrugated slats secured to and connecting said heads, the slats being arranged to provide slots therebetween, a base arranged below the cylinder, a pair of spaced uprights secured to the base provided with bearings, bearing sleeves secured to the heads and arranged on opposite sides of the axial center thereof, said bearing sleeves being rotatably mounted within the bearings, a perforated hollow pipe extending through the bearing sleeves and eccentrically through the cylinder, and means for rotating the cylinder from one of the bearing sleeves.

In testimony that we claim the foregoing we have hereunto set our hands at Milwaukee, in the county of Milwaukee and State of Wisconsin.

ALFRED G. SUELFLOW.
CHARLES WOLFORD.